Oct. 2, 1962 J. DE YOUNG 3,056,549
ANGLE COUNTER WITH ANTI-FRICTION BEARINGS
Filed Dec. 4, 1958 5 Sheets-Sheet 1

JOHN DE YOUNG
INVENTOR.

ATTORNEY

Oct. 2, 1962  J. DE YOUNG  3,056,549
ANGLE COUNTER WITH ANTI-FRICTION BEARINGS
Filed Dec. 4, 1958  5 Sheets-Sheet 3

JOHN DE YOUNG
INVENTOR.

BY
ATTORNEY

JOHN DE YOUNG
*INVENTOR.*

ATTORNEY

Oct. 2, 1962  J. DE YOUNG  3,056,549
ANGLE COUNTER WITH ANTI-FRICTION BEARINGS
Filed Dec. 4, 1958  5 Sheets-Sheet 5

INVENTOR.
JOHN DE YOUNG
BY
ATTORNEY

United States Patent Office 3,056,549
Patented Oct. 2, 1962

3,056,549
ANGLE COUNTER WITH ANTI-FRICTION
BEARINGS
John De Young, Little Falls, N.J., assignor to General
Precision Inc., a corporation of Delaware
Filed Dec. 4, 1958, Ser. No. 778,174
13 Claims. (Cl. 235—117)

This invention relates to counters, and is particularly directed to small angle counters used for indicating angles numerically in degrees, or degrees and decimals of a degree.

This invention represents an improvement on Patent No. 2,463,594, issued to Charles W. Brigham, on March 8, 1949, on an "Angle Counter," and assigned to the same assignee as the present invention.

It is primarily directed to an angle counter which may be operated at considerably higher speed and to a greater degree of accuracy than the angle counter shown in the above patent.

In high speed aircraft and the like, it is essential that an angle counter be operated at a relatively high speed and that a high degree of accuracy of the mechanism of the counter be maintained at such high speeds.

It is also important that the parts supporting the rotating index members, or drums of the counter be small and compact, and rugged so that they will withstand high speed operation over a sustained period.

A primary advantage of this angle counter is that the indexing mechanism is simplified and that the mechanism for resetting the counter to zero, at the point at which a 360° reading would be obtained, is compact, accurate and automatic in its operation.

Another feature of the counter is that it is readily reversible, the angular readings being either advanced or reduced, without affecting the operation or the accuracy of the counter in any manner, or making any adjustments in the mechanism, other than the reversal of the drive shaft, which is utilized to drive the counter.

Another feature of the construction is that essentially the same angle counter can be utilized for registering degrees and tenths of a degree, or degrees only, through a range of 0° to 359.9° or 359°, the case, and all the operating parts and numerical drums of the counter remaining essentially the same.

Another feature of the construction is that the drive shaft, which is used to drive and operate the counter, is mounted on anti-friction bearings, and that the major portions of the actuating mechanism mounted on the drive shaft and the drum support shaft are mounted on anti-friction bearings, so that the counter can be operated at relatively high speeds and still maintain a high degree of accuracy.

Another feature of the construction is that the shafts supporting the indicator drums and the other parts of the actuating mechanism, are simple and rugged, so that they can be produced to a high degree of accuracy at a relatively low cost.

Another essential feature of the construction is that the number of shafts supporting the indexing drums and the actuating mechanism is reduced to a minimum, all of the drums being mounted on a single drum support shaft.

A major feature of the invention is that a combination transfer and intermittent locking mechanism is provided, as a single compact unit, which can be adjusted prior to mounting, and readily fitted to the counter without hand fitting and adjustments.

Another feature is that a major portion of the transfer mechanism employed, consists of spur gears or sections of spur gears, so they can be fabricated on conventional machines at relatively low cost.

A major advantage of the counter is that the various transfer mechanisms employed are simple, compact, and can be produced to a high degree of accuracy at a relatively low cost.

Another feature of the device is that the entire unit is small, light and compact, so that it can be utilized in aircraft or navigation equipment mounted on aircraft, the unit occupying a relatively small space in the aircraft.

The accompanying drawings, illustrative of one embodiment of the invention, and several modifications thereof, together with the description of their construction and the method of operation, co-ordination and utilization thereof, will serve to clarify further objects and advantages of the invention.

In the drawings:

FIGURE 4 is a cross-section, and partial bottom plan view, similar to FIGURE 3, through a modification of the angle counter mechanism shown in FIGURE 15, showing the Geneva wheel for transferring the rotation of the units, or degree drum shown in FIGURE 16, to the tens drum, and a portion of the units drum, including the drive pin for controlling the rotation of the Geneva wheel, and the locking disc attached to the units drum for restraining the rotation of the Geneva wheel, the locking disc being shown in engagement with one of the cutouts around the outer circumference of the Geneva wheel, thereby momentarily preventing rotation of the Geneva wheel, the pin attached to the units drum being located in substantial alignment with one of the radially positioned slots through the Geneva wheel. The units drum is also shown in dot-dash lines, rotated into a position in which the circular segmental cutout through the locking, disc allows the Geneva wheel to be rotated, the actuating pin attached to the units drum being fitted to one of the radially positioned slots through the Geneva wheel, thereby controlling the rotational angular movement of the Geneva wheel.

FIGURE 5 is a cross-section and partial plan view similar to FIGURE 3, through another portion of the angle counter mechanism shown in FIGURE 1, showing the star locking disc and the flange pinion mounted on the drive shaft, and the locking plate which is attached to one face of the units, or degree drum, the locking plate being used in conjunction with the star locking disc mounted adjacent the drive shaft dual flange pinion, also the trip gear which meshes with one pinion flange of the drive shaft dual flange pinion to control the rotation of the units drum, the section being taken on the line 5—5, FIGURE 1. The locking plate is shown in a position in which the radial slot through the locking plate is fitted to one of the radially positioned teeth around the star locking disc. The teeth of the trip gear are shown in mesh with the teeth of the flange pinion of the tubular dual pinion to which the star locking plate is attached.

It will be understood that the following description of the construction and the method of support, operation, coordination and utilization of the angle counter with anti-friction bearing shafts, is intended as explanatory of the invention and not restrictive thereof.

In the drawings, the same reference numerals designate the same parts throughout the various views, except where otherwise indicated.

Figure 1:
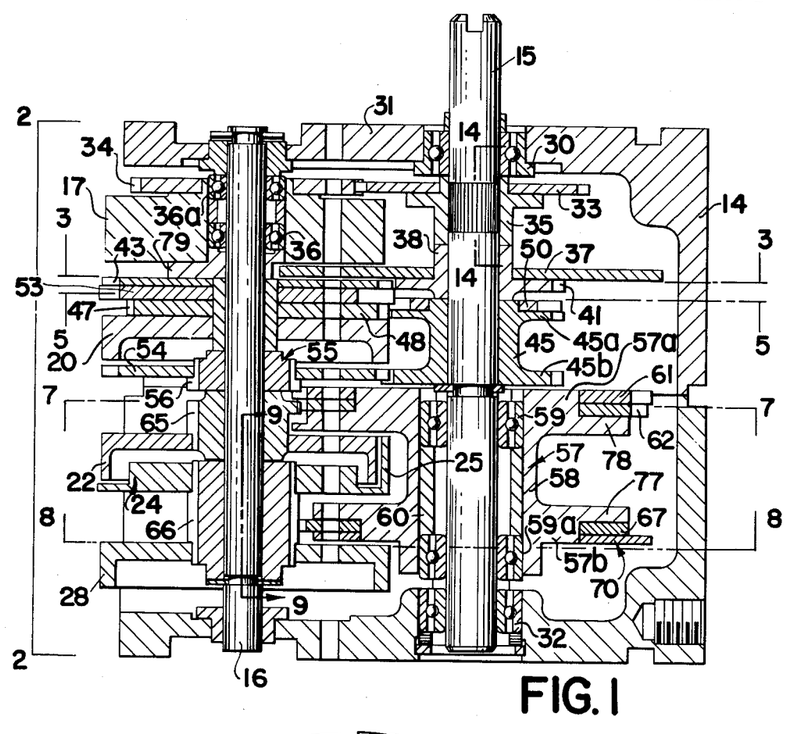
FIGURE 1 represents a longitudinal section through the complete angle counter, shown in FIGURE 2, showing the drive shaft and the drum support shaft, the series of drums designating various angles numerically, the drive mechanisms for controlling the rotation of the individual drums, and the transfer mechanisms for transferring the rotation of each of the drums to the drum of the next series, the section being taken on the line 1—1, FIGURE 2.
Figure 2:
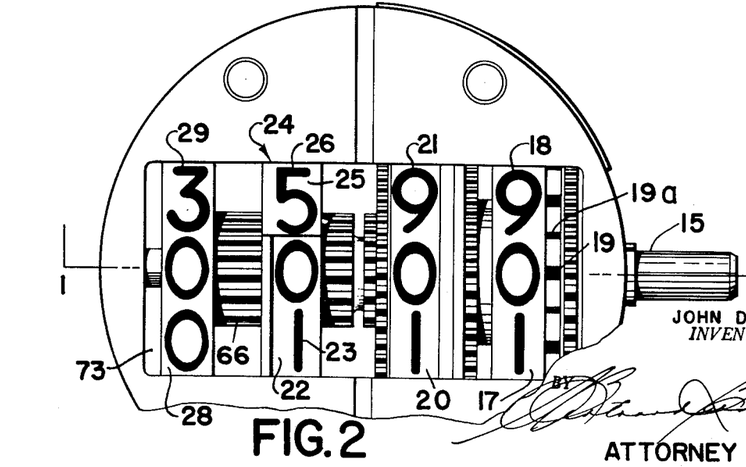
FIGURE 2 is a plan view of the assembled angle counter shown in FIGURE 1, showing the housing, the various rotating drums, and the arrangement of the numerical designations on each of the drums, also the projecting end of the drive shaft.

One embodiment of the angle counter shown in FIGURES 1 and 2, is mounted in a substantially cylindrical housing 14, the housing supporting two substantially parallel shafts, both of which are substantially perpendicular to the axis of the housing, and including a drive shaft 15, one end of which projects beyond the outer circumference of the housing, and a drum support shaft 16, which is parallel to the drive shaft 15 and located close to the upper end of the housing 14, left-hand, FIGURE 1.

A series of cylindrical drums is mounted on the drum support shaft, as indicated in FIGURES 1 and 2, the drums including a tenths drum 17, located at the right-hand side of FIGURE 2, the tenths drum having a series of numerical designations 18, ranging from 0 to 9, around the outer circumference thereof, the rotational angular position of the tenths drum corresponding to the angular position of the drive shaft 15, the graduations representing tenths of a degree of angular movement of the drive shaft.

In addition to the numerals 18, the tenths drum has a series of line graduations at one edge thereof, one series of graduations 19 being aligned with the corresponding numerals, an intermediate series of graduations 19a being located midway between each pair of numerals 18, 18a.

A units, or degree drum 20 carrying a series of numerals 21, reading from 0 to 9, around the outer circumference thereof, is mounted adjacent the tenths drum 17, the units or degree drum indicating degrees of angular movement, one numerical step or a 36° rotational angular movement in the rotation of the units, or degree drum, being equal to one full revolution of the tenths drum.

Figure 10:
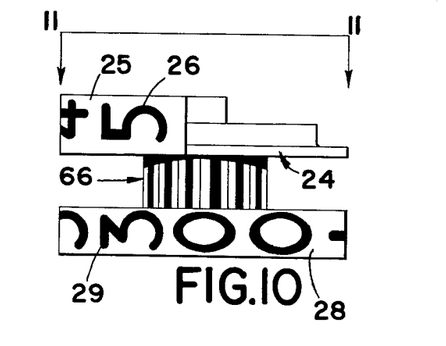
FIGURE 10 is a plan view of a portion of the circular segmental rim of the tens drum sector and the outer circumference of the hundreds drum, showing the relation between the number designations on the circumferential flange of the tens drum sector and the outer circumference of the hundreds drum, which are substantially the same as those shown in FIGURE 2.
Figure 11:
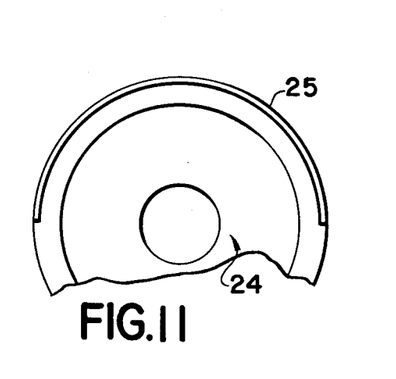
FIGURE 11 is a side elevational view of the tens drum sector and the circular segmental rim surrounding a portion of the tens drum sector shown in FIGURES 9 and 10, taken on the line 11—11, FIGURE 10.

A tens drum 22, which also has a series of numerical designations 23, reading from 0 to 9, around the outer circumference thereof, is mounted adjacent the units or degree drum, the tens drum being rotated through one numerical step, or 36°, for each complete revolution of the units or degree drum, during a portion of the angular range, except duirng the period in which the tens indications appear on a tens drum sector 24, which has a thin rim 25, of circular segmental contour, surrounding and shielding a portion of the outer circumference of the tens drum, the rim of the tens drum sector having a series of numerals 26, ranging from 1 to 5, around the outer circumference thereof, as shown in FIGURES 2 and 10, the angular spacing between the numerals 26 being substantially the same as those on the tens drum, the tens drum sector designating the tens digit of the drive shaft angle position indicated, during the period in which the rotation of the tens drum 22 is arrested, or the numerals on the outer circumference of the tens drum are obscured in the manner hereinafter described.

The hundreds drum 28, which is located adjacent the tens drum sector 24, has a series of numerals 29, reading from 0 to 3 around the outer circumference thereof, the angular spacing between the numerals being substantially the same as those on the outer circumference of the tens drum 22, several of the numerals 29, including the numeral 3, and the numeral 0, being repeated, as the hundreds drum indicates the same numerals at a number of angular positions of the hundreds drum, the hundreds drum 28 being fixedly attached to and rotating with the tens drum sector 24 for reasons hereinafter described in greater detail. While some of the numerals 29 on the outer circumference of the hundreds drum are repeated, and therefore do not change at many rotational angular positions of the hundreds drum, the hundreds drum is rotated through various steps, co-ordinated with the rotation of the tens drum 22, while the tens drum is in operation, and through one step representing the angular spacing between each pair of numerals on the hundreds drum, during the corresponding angular movement of the tens drum sector 24, which is fixedly attached to the hundreds drum 28.

The drive shaft 15 is rotatably supported by a pair of ball bearings, including a flanged ball bearing 30, supported by the circumferential outer wall 31 of the housing, at the end of the housing, near which the tenths drum 17 is located, and another ball bearing 32 fitted to the opposite end of the drive shaft, the ball bearing 32 being mounted in a boss projecting inward from the opposite side of the circumferential outer wall of the housing.

The rotational angular movement of the drive shaft 15 is directly transmitted to the tenths drum 17 by a pair of gears 33, 34 having a 1 to 1 ratio, the drive gear 33 being fixedly supported by a tubular hub 35, which is fixedly attached to the drive shaft 15. The driven gear 34 of the pair, is fixedly attached to the tenths drum 17, a pilot integral with the tenths drum accurately centering the driven gear 34 relative to the tenths drum 17.

In this manner, the tenths drum 17 is rotated through one full revolution for each complete revolution of the drive shaft 15, and as the degree drum 20 is moved through one numerical step, or the angular movement between each adjacent pair of numerals, which is 36°, for each complete revolution of the tenths drum, the degree drum is moved through one step for each revolution of the drive shaft.

The tenths drum 17 is rotatably supported on the drum shaft 16 by a pair of ball bearings 36, 36a separated by a tubular spacer, thus assuring free rotation of the tenths drum about the drum shaft 16, at relatively high speeds, and as the tenths drum rotates continuously when the drive shaft is rotated, and at the same speed as the drive shaft, facilitates high-speed operation of the angle counter.

A Geneva drive is utilized as one step in transmitting the rotation of the tenths drum 17 to the units, or degree drum 20. The Geneva drive consists of a Geneva wheel 37, which is fixedly attached to a tubular gear and hub combination 38 trunnioned on the drive shaft 15. The Geneva wheel has six equally spaced substantially parallel-faced radial slots 39 therethrough, the slots 39 progressively and sequentially receiving a cylindrical pin 40 inserted in and projecting beyond one face of the tenths drum 17, so that the Geneva wheel 37 and the gear 41, which is fixedly attached thereto, are rotated through 60° for each complete revolution of the tenths drum 17.

The gear 41 integral with the tubular hub 38, which supports the Geneva wheel, meshes with a gear 43 attached to the units or degree drum 20, thereby transmitting the rotation of the Geneva wheel 37 to the units drum. As there is a 3:5 reduction between the gear 41 and the gear 43, the 60° angular movement of the Geneva wheel 37 is reduced to 36° at the units drum, thus providing a 36° rotational angular movement, which is equal to the angular distance between each pair of numerals 21 on the outer circumference of the units drum, for each complete revolution of the tenths drum 17, and therefore the drive shaft 15.

A dual tubular pinion 45 having a substantially circular flange pinion 45a, 45b, integral with each end thereof, is mounted on the drive shaft 15, in substantially axial alignment with the units drum 20.

The teeth of one flange pinion 45a of the tubular pinion, mesh with the teeth 47 of a trip gear 48, which is fixedly attached to the units or degree drum 20, the function of the trip gear being hereinafter described in greater detail.

A star locking plate 50, having six equally spaced radially positioned teeth 51 around the outer circumference thereof, is attached to one face of the dual tubular pinion 45, adjacent the flange pinion 45a.

In the operating position, which will hereinafter be described in greater detail, one of the radially positioned teeth 51 of the star locking plate 50, selectively fits into a radially positioned slot 52 cut into the outer circumference of a locking disc 53, which is fixedly attached to the face of the units drum, the locking disc being located between the gear 43 and the trip gear 48, all of which are fixedly attached to the units or degree drum 20.

An idler spur gear 54, which is mounted on a tubular hub 55 having a flange pinion 56 integral with one end thereof, is mounted on the drum shaft 16, adjacent the face of the units or degree drum 20, opposite the face to which the trip gear 48 is attached. The idler gear 54 mounted on the tubular hub 55 meshes with the aligned flange pinion 45b of the dual tubular pinion 45.

The pinion teeth on the flange pinion 45b of the dual tubular pinion, which mesh with the idler gear, which has the same number of teeth as the relative number of teeth of the trip gear 48, step down the angular movement of the idler gear 54 to the same rotational angular movement as the trip gear 48, attached to the units drum, and therefore provide the same rotational angular movement as that of the units drum, while the units or degree drum 20 is rotated.

A tubular intermittent locking sleeve 57, having a pair of flanges 57a, 57b integral with the ends thereof, is mounted on the drive shaft 15, the flanges 57a and 57b of the locking sleeve straddling the tens drum 22. The tubular hub 58 of the intermittent locking sleeve 57 is supported by a pair of ball bearings 59, 59a, which are mounted on the drive shaft 15, the ball bearings being separated by a tubular spacer 60.

A plate spur gear 61, attached to one flange 57a of the tubular locking sleeve 57 meshes with the teeth on the flange pinion 56 of the tubular hub 55.

Figure 7:
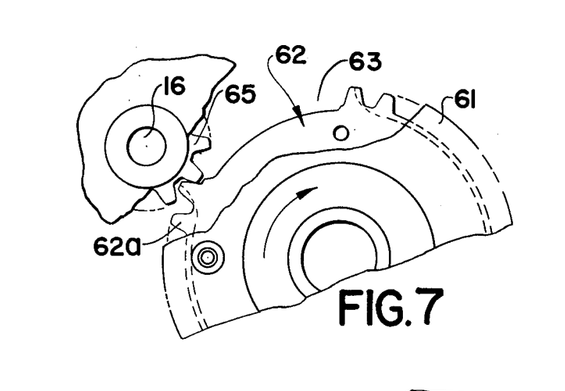
FIGURE 7 is a cross-section and partial plan view through a portion of the intermittent locking mechanism used in conjunction with the tens drum, and the tens drum sector provided in conjunction with it, showing the trip gear which is attached to the intermittent locking sleeve, the pinion attached to the tens drum, which meshes with the trip gear, and the circular segmental cutout area provided around a portion of the trip gear to serve as a tripping mechanism, the section being taken on the line 7—7, FIGURE 1.

A trip gear 62, having teeth 62a around the outer circumference thereof, except for a circular segmental trip area 63, which is recessed below the root diameter of the teeth 62a as shown in FIGURE 7, to serve as a tripping mechanism in a manner hereinafter described in detail, is mounted adjacent and fixedly attached to the flange 57a of the locking sleeve 57, between the plate gear 61 and the flange 57a, the teeth of the trip gear 62 meshing with a small spur pinion 65, which is co-axial with and rotatably supports the tens drum 22 on the drum shaft 16, as shown in FIGURE 1.

Figure 9:
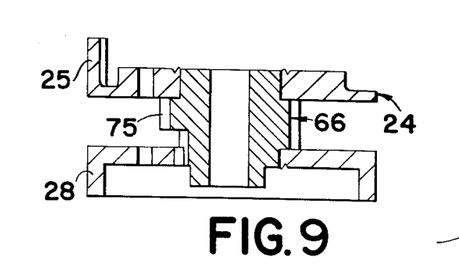
FIGURE 9 is a longitudinal section through the tens drum sector and pinion assembly, shown in FIGURE 1, including the tens drum sector, the hundreds drum, and the sector drive pinion supporting the tens drum sector and the hundreds drum, as shown in FIGURE 1, the section being taken on the line 9—9, FIGURE 1.
Figure 12:
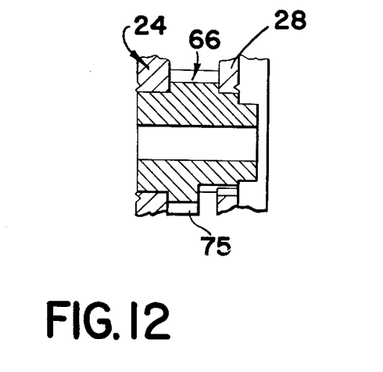
FIGURE 12 is a longitudinal section, similar to FIGURE 9, through the sector drive pinion shown in FIGURE 9, and a portion of the hundreds drum and the tens drum sector supported by the drive pinion, the section being taken on the line 9—9, FIGURE 1.

The tens drum sector 24, the circular segmental indicator rim 25 of which surrounds a portion of the tens drum, subtended by an angle of approximately 180°, and the hundreds drum, are located axially on opposite sides of and fixedly attached to a small sector drive pinion 66, which is trunnioned on the drum shaft 16, between the flanges 57a, 57b of the intermittent locking sleeve 57, the tens drum sector 24 and the hundreds drum 28 being coaxial with the sector drive pinion 66, a pair of cylindrical pilots on the ends of the sector drive pinion 66, supporting the tens drum sector and the hundreds drum 28, respectively, in the manner shown in detail in FIGURES 9 and 12.

The sector drive pinion 66 is driven by a trip gear 67, which is fixedly attached to one flange 57b of the tubular locking sleeve 57. The trip gear 67 has a series of teeth, covering a circular segment 68 subtended by an angle of approximately 80°, and a pair of individual teeth 69, located around the outer circumference thereof, each of the individual teeth 69 being located approximately 90° from the adjacent end of the toothed circular segment 68. The detailed function of the trip gear 67 and the teeth integral therewith, in the operation of the tens drum sector and the hundreds drum 28, will hereinafter be described.

Figure 8:
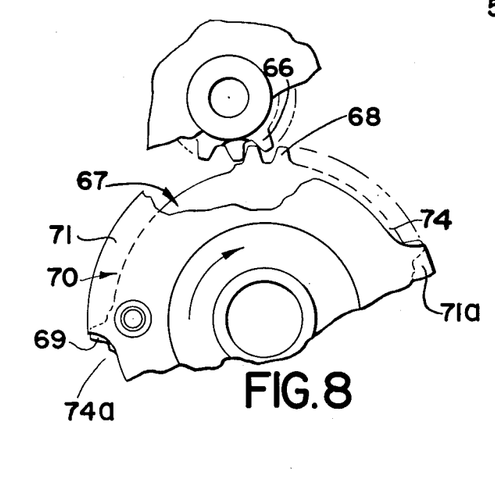
FIGURE 8 is a cross-section and partial bottom plan view, similar to FIGURE 7, through a portion of the angle counter mechanism, located adjacent the opposite flange of the intermittent locking mechanism, shown in FIGURES 1 and 7, showing the trip plate attached to the intermittent locking sleeve, the trip gear, which is attached to the flange of the intermittent locking sleeve, adjacent the trip plate, the pinion attached to the tens drum sector which is driven by the trip gear, and the cutaway section provided on some of the teeth of the drive pinion for clearing the flanges of the trip plate, also the intermittent locking sleeve, the section being taken on the line 8—8, FIGURE 1.

A trip plate 70, having a pair of diametrically opposite circular segments 71, 71a integral therewith, is fixedly attached to the second flange 57b of the intermittent locking sleeve 57, adjacent the trip gear 67, as shown in FIGURES 1 and 8, the trip gear and the trip plate 70 being held concentric with the flange of the intermittent locking sleeve 57, by a pilot integral with the intermittent locking sleeve.

Figure 13:
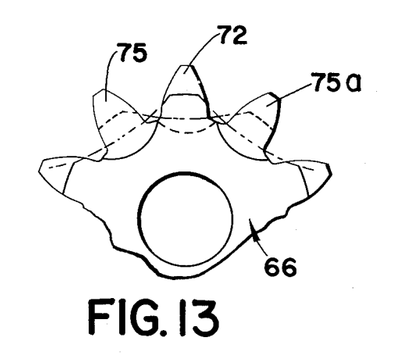
FIGURE 13 is a side elevational view of the sector drive pinion shown in FIGURES 9, 10 and 12, showing the cutouts through some of the teeth of the pinion to clear the segments of the trip plate and the segments of the flange of the intermittent locking sleeve shown in FIGURES 1 and 8.
Figure 14:
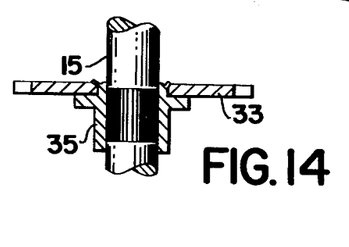
FIGURE 14 is a longitudinal section through a portion of the drive shaft, shown in FIGURE 1, showing the tubular hub and the tenths drum drive gear attached to the tubular hub, the section being taken on the line 14—14, FIGURE 1.

A portion of the teeth of the sector drive pinion 66, are cut away at two points located approximately one tooth distance, or 36°, from the central tooth 72, as shown in FIGURE 13, the cut-away sections of the teeth being in axial alignment with the trip plate 70, to clear the radial segments 71, 71a of the trip plate at specific rotational angular positions of the intermittent locking sleeve 57.

The operative function and the method of co-ordination and locking of the tens drum sector 24 at specific rotational angular positions of the tens drum 22 will hereinafter be described in greater detail.

Figure 15:
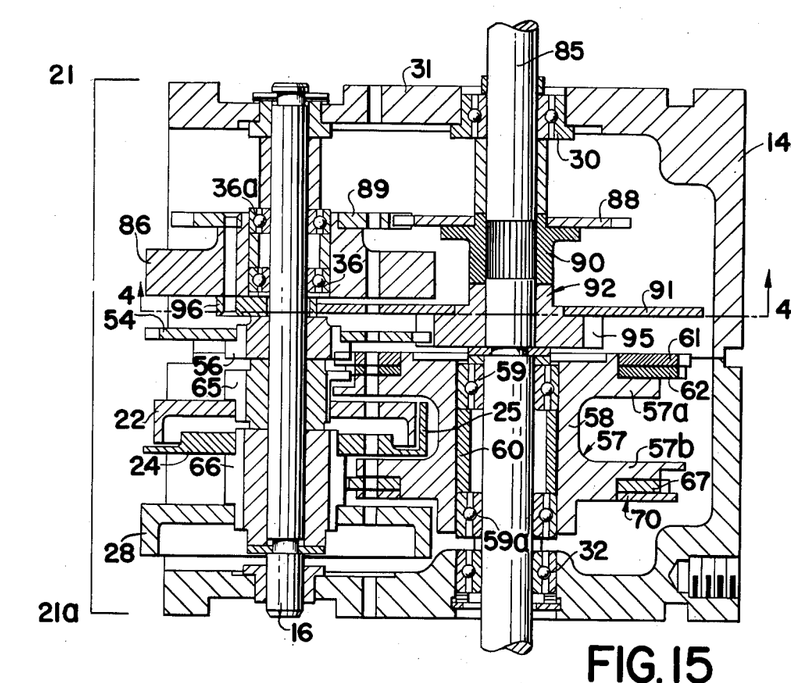
FIGURE 15 is a longitudinal section, similar to FIGURE 1, through a modification of the angle counter shown in FIGURES 1 and 2, showing the modified drive shaft, the drum support shaft, the units drum, the tens drum, the tens drum sector and the hundreds drum shown in FIGURE 1, the drive mechanisms for controlling the rotation of the drums, and the transfer mechanisms for transferring the rotation of each of the drums to the next drum of the series, the section being taken on the line 15—15, FIGURE 16.

The intermittent locking sleeve assembly, which is shown in FIGURES 1, 8 and 15, is utilized to control the operation of the tens drum 22 and the tens drum sector 24, and as the hundreds drum is fixedly attached to the tens drum sector 24, it also controls the rotation of the hundreds drum 28.

The intermittent locking sleeve 57 is driven by a plate spur gear 61 attached to one flange 57a, thereof, the plate spur gear 61 being driven by a flange pinion 56 attached to the idler gear 54 which is located adjacent the degree drum 20, as shown in FIGURE 1. The intermittent locking sleeve 57 is therefore advanced through 10° for each 36° angular movement of the degree, or units drum 20, or the spacing between one pair of numerals on the outer circumference of the degree drum.

The trip gear 62, which is attached to the flange 57a of the intermittent locking sleeve 57, meshes with the pinion 65 attached to the tens drum 22. As there is a 36 to 10 step up between the trip gear 62 and the pinion 65, while the teeth on the trip gear 62 are in mesh with the pinion 65, the tens drum 22 is advanced through an angle of 36°, or the angular spacing between each pair of numerals on the outer circumference of the tens drum, for each 10° rotational angular movement of the intermittent locking sleeve 57.

While the teeth of the tens drum drive pinion 65 pass the undercut areas 63 of the trip gear 62, which is subtended by an angular range of about 60°, the rotation of the drive pinion 65 and therefore of the tens drum is arrested.

During this period, the tens drum sector 24 is rotated by the intermittent locking sleeve 57 in a manner hereinafter described.

During the period through which the tens drum 22 is locked in the manner hereinbefore described, the sector drive pinion 66 attached to the tens drum sector, is in engagement with the toothed segment 68 of the trip gear 67, which is attached to the opposite flange 57b of the intermittent locking sleeve 57, as shown in FIGURES 1 and 8.

This portion of the trip gear 67 rotates the tens drum sector through an angular range of approximately 180°, which is the angular range of the semi-circular rim area 25 of the tens drum sector 24, around which the numerals 1 through 5 are indicated, plus an additional angular range required to move the tens drum sector into and out of the visual range of the opening 73 through the upper wall of the housing shown in FIGURE 2.

The trip plate 70, which is attached to the flange 57b of the intermittent locking sleeve 57, adjacent the trip gear 67, has two diametrically opposite locking segments 71, 71a integral therewith, the two locking segments 71, 71a being separated by a pair of undercut areas 74, 74a, as shown in FIGURE 8.

The two radially positioned individual teeth 69 of the trip gear 67, which are radially separated from the teeth around the toothed segment 68 of the trip gear, are each located approximately 90° from the adjacent end of the toothed segment 68.

The upper or smaller undercut area of the trip plate 70 subtends an angle which is somewhat smaller than the angular range of 80° subtended by the toothed segment 68 of the trip gear 67.

The angle subtended by the lower, or diametrically opposite circumferential undercut area around the trip plate 70, is equal to about 100°, which is substantially equal to the angle between the two individual teeth 69, of the trip gear, and located in the same radial position relative to the trip gear 67.

The radial center lines of the individual teeth 69, coincide substantially with the extremities of the stop segments 71, 71a adjacent the circumferential cutout area of the trip plate.

Several of the teeth 75, 75a of the pinion 66 attached to the tens drum sector 24 and the hundreds drum 28, are cut away, as shown in FIGURE 13, to clear the stop segments 71, 71a of the trip plate. In the same manner, one of the teeth 72 of the pinion 66 located between the cutaway teeth 75, 75a, and portions of the the adjoining teeth thereof, are also cut away to clear the radially positioned diametrically opposite segments 77, of the flange 57b of the intermittent locking sleeve, as shown in FIGURE 1, the angles subtended by the circular segments 77, of the flange coinciding substantially with the circumferential undercut areas between the circular segments 71, 71a of the trip plate.

The cutaway areas of the teeth of the sector drive pinion 66, allow the intermittent locking sleeve 57 to be rotated, during the periods in which the tens drum sector 24 and the hundreds drum 28 are locked and prevented from rotation in the manner hereinbefore described.

In the same manner, a portion of one tooth, and portions of the adjoining teeth of the pinion 65 attached to the tens drum 22 are cut away to clear the stop segments 78, of the adjoining flange of the intermittent locking sleeve 57, to permit the intermittent locking sleeve 57 to be rotated while the tens drum 22 and the pinion attached thereto are held stationary in the manner hereinbefore described.

*Operation*

The drive shaft 15 of the angle counter, shown in FIGURES 1 and 2, is driven by an external source, the shaft of which is attached to the projecting end of the drive shaft 15.

The tenths drum which is mounted on the drum support shaft is driven by the drive shaft through a pair of gears 33, 34, the ratio of which is 1:1, so that the rotational angular movement of the drum support shaft is substantially the same as that of the drive shaft, except that the direction of rotation is reversed.

The rotation of the tenths drum 17 is stepped down by means of the Geneva wheel 37 which is mounted on the drive shaft 15. As there are six radially positioned slots 39, 39a through the Geneva wheel, the rotation of the Geneva wheel is stepped down by a ratio of 1:6, so that the angular movement of the Geneva wheel is 60° for each complete revolution of the tenths drum 17.

The angular movement of the Geneva wheel 37 is reduced by a pair of gears 41, 43 the ratio of which is 3:5 so that the units or degree drum 20 is rotated through an angle of 36°, or the angular spacing between a successive pair of numerals on the outer circumference of the units or degree drum for each 60° angular movement of the Geneva wheel 37.

The angular movement of the tubular dual pinion is stepped up again by a pair of gears, including the trip gear 48 attached to the units drum, and the flange pinion 45a, which is integral with the tubular dual pinion 45. As the ratio between the trip gear 48 and the tubular flange pinion 45a is 36:60, the angular movement of the tubular dual pinion 45 is again stepped up to 60°.

The flange pinion 45b at the opposite end of the tubular dual pinion 45 meshes with an idler gear 54 mounted adjacent the opposite face of the units drum. As the ratio between the flange pinion and the idler gear is 60:36, the angular movement of the idler gear 54 and the flange pinion attached thereto is 36°, which is equal to the angular movement of the units or degree drum 20.

As the flange pinion 56 attached to the idler gear has 10 teeth, and the mating plate gear 61 attached to one flange of the intermittent locking sleeve has 36 teeth, the intermittent locking sleeve is rotated through a 10° angle for each 36° angular movement of the idler gear 54.

The trip gear 62 attached to the flange 57a of the intermittent locking sleeve, meshes with a drive pinion 65 attached to the tens drum. During the period through which the trip gear 62 attached to the intermittent locking sleeve, drives the pinion attached to the tens drum, the tens drum is advanced through an angle of 36°, or the spacing between one pair of numerals on the outer circumferential surface of the tens drum, as the ratio between the trip gear attached to the flange of the intermittent locking sleeve 57, and the pinion attached to the tens drum is 36:10.

During the time interval through which the tens drum 22 is locked by the trip gear 62, in a manner hereinafter described, and the numerals on the tens digit scale appear on the outer circumference of the rim of the tens drum sector 24, the sector drive pinion 66 mounted between and supporting the tens drum sector 24 and the hundreds drum, is driven by the trip gear 67 attached to the opposite flange of the intermittent locking sleeve. As the ratio between the pinion 66 and the trip gear attached to the flange of the intermittent locking sleeve 57, is 10:36, the ten degree angular movement of the intermittent locking sleeve is stepped up to 36° again on the tens drum sector, which is equal to the spacing between one pair of numerals on the outer circumference of the rim of the tens drum sector.

As the hundreds drum 28 is fixedly attached to the tens drum sector, the hundreds drum is advanced through a 36° angular interval for each 36° rotational angular movement of the tens drum sector.

As during a major portion of the period of rotation of the tens drum sector 24, the numerals on the outer circumference of the hundreds drum 28 are repeated, the rotational angular movement of the hundreds drum 28, during this period, has no effect on the reading, as the hundreds drum reading remains constant, until the tens drum sector is again out of visual range through the opening through the upper wall of the housing 14.

Figure 4:
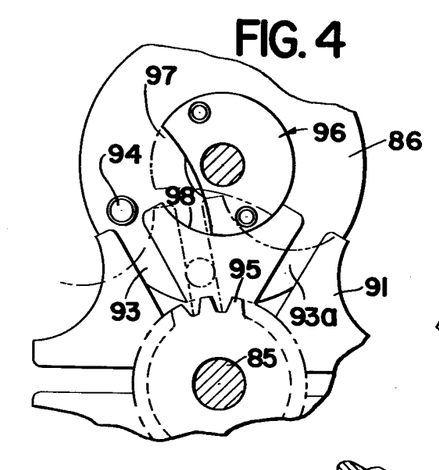

During the period of rotation of the tenths drum 17, in which the locking disc 79 (96) attached to one face of the tenths drum 17 or the units drum 86, in the construction shown in FIGURE 4 is in the position shown in FIGURE 4, the outer circumference of the locking disc 79 (96) fits into one of the circular segmental cutouts 80 (98) around the outer circumference of the radial segments of the Geneva wheel 37 (91), as shown in FIGURE 4. This locks the Geneva wheel 37 (91) and prevents rotation thereof, while the tenths drum and the locking disc attached thereto, or the units drum 86, in the modified construction shown in FIGURE 15, are in substantially the angular range shown in FIGURE 4, relative to the Geneva wheel.

After the tenths drum 17 or the units drum 86, shown in FIGURE 4, reaches a position at which the projecting pin 40 (94), inserted therein, is aligned with one of the radial slots 39, 39a (93, 93a) through the Geneva wheel, in substantially the position shown at the left-hand side, FIGURE 4, the projecting pin progressively moves into and along the slot 39 (93) through the Geneva wheel.

The continued rotation of the tenths drum causes the segments adjacent the slot 39 (93), through the Geneva wheel, to be moved through an angular range of 60°, which is equal to the angular spacing between the slots 39, 39a (93, 93a), through the Geneva wheel.

Figure 3:
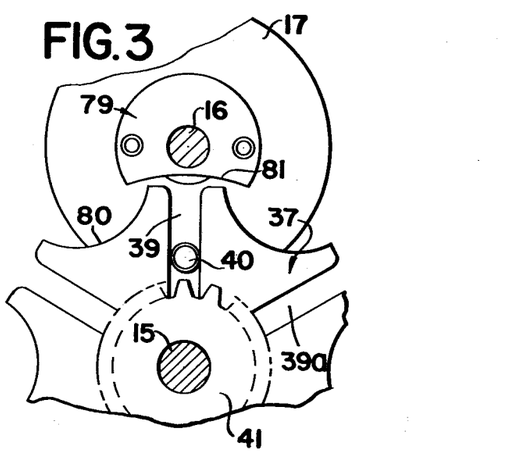
FIGURE 3 is a cross-section through a portion of the counter mechanism shown in FIGURE 1, and a partial bottom plan view thereof, showing the Geneva wheel for transferring the rotation of the tenths drum to the units drum, and a portion of the tenths drum, including the drive pin for driving the Geneva wheel. The tenths drum is shown in a position in which the cutout through the locking disc attached to the tenths drum is shown in a position, in which the outer circumference of the Geneva wheel is free of the locking disc, the section being taken on the line 3—3, FIGURE 1.

While the projecting pin 40 (94) is in engagement with one of the slots 39, 39a (93, 93a) through the Geneva wheel, the cutout 81 (97) of circular segmental contour, through a portion of the locking disc, is substantially in the position shown in FIGURE 3, thereby allowing the outer circumference of the Geneva wheel 37 (91) to clear the locking disc, and in that manner allowing the Geneva wheel to be rotated through 60°, thereby advancing the units, or degree drum through the angular spacing between one pair of numerals on the outer circumference of the units, or degree drum, or in the modified construction, shown in FIGURES 15 and 4, the tens drum of the tens drum sector, depending upon the angular position indicated. In the position, shown in FIGURE 3, the tenths drum is located at the centre graduation between a pair of numerals 9 and 0, on the outer circumference of the tenths drum 17, so that when the Geneva wheel 37 reaches the end of its 60° angular movement, the numerical designation on the outer circumference of the tenths drum is at a rotational position between the next pair of numerals 0 and 1, the tenths drum having completed a full transfer, the gear train causing the units, or degree drum to be advanced through 36°, or the angular spacing between one pair of numerals on the outer circumference of the degree drum. In the modified construction shown in FIGURE 4, this condition is substantially the same, except that the units drum 86 is advanced from an angular position between the numerals 9 and 0, through one transfer step, to an angular position between the next pair of numerals 0 and 1, the transfer mechanism causing the tens drum or the tens sector drum to be advanced through 36°, or the spacing between one pair of numerals, depending upon the angle indicated at a particular time interval.

At any rotational angular position of the degree drum 20, except that between the numerals 9 and 0, the outer circumference of the circular locking disc 53 fits into one of the circular segmental cutouts 82 around the outer circumference of the star locking plate 50, thereby preventing rotation of the star locking plate 50 and the dual pinion 45 to which it is attached, except when the units, or degree drum is located between the 9 and 0 angular positions.

Figure 5:
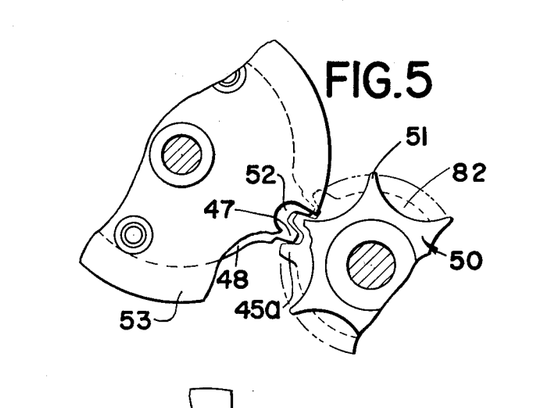

FIGURE 5 shows the relation between the star locking plate attached to the tubular dual pinion 45, and the circular locking disc 53 attached to the units, or degree drum, when the units, or degree drum 20 is at an angular position corresponding to the point between the numerals between 9 and 0.

At this rotational angular position, the radial slot 52 through the outer circumference of the circular locking disc is in substantial radial alignment with and clears one of the radially positioned teeth 51, around the star locking plate 50, thereby allowing the star locking plate 50 and the dual pinion to which it is attached to be rotated.

Figure 6:
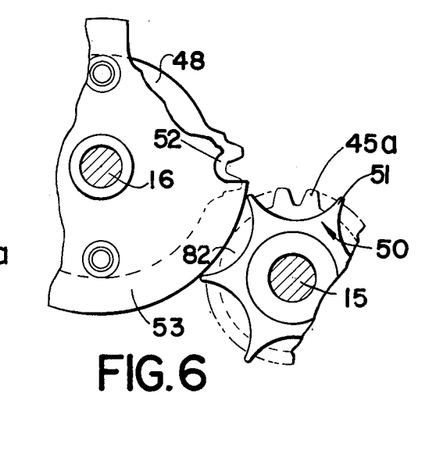
FIGURE 6 is a cross-section and partial plan view, similar to FIGURE 5, through the portion of the angle counter mechanism, at which the cross-section shown in FIGURE 5 is taken, showing the locking plate and the units drum to which it is attached, rotated into a position in which the outer circumference of the locking plate is in engagement with one of the circular segmental cutouts between pairs of teeth of the star locking disc, thus restraining the rotation of the star locking disc and the flange pinion of the tubular dual pinion, the teeth of the trip gear attached to the units drum, being rotated into a position in which they are out of engagement with the flange pinion of the tubular dual pinion.

The two teeth 47 of the trip gear 48, which mesh with the flange pinion 45a of the tubular dual pinion advance the tubular dual pinion through an angle of 60°, from the start of the engagement of the teeth of the trip gear with the flange pinion, until the star locking plate 50 is again in its locked position, shown in FIGURE 6, thus advancing the tens drum 22, or the tens drum sector, through the angular spacing between one pair of numerals, or 360°, the movement of the tens drum or the tens drum sector depending upon the angular position of the intermittent locking sleeve 57 at a particular time interval in the manner hereinbefore described.

From a zero reading until 9.9 degrees, on the circumferential outer surfaces of the drums, the tens and hundreds drum and the tens drum sector are stationary, the tenths drum and the degree drum being progressively rotated from 0 to 9.9° in the manner hereinbefore described.

From 10° to 99.9°, the hundreds drum and the tens drum sector 24 are locked, the degree drum and the tens drum 22 advancing progressively from 10 degrees to 99.9° in the manner hereinbefore described.

From 100° to 309.9°, the degree drum, the tens drum, and the hundreds drum advance progressively with rotation of the drive shaft, the tens drum sector 24, which rotates with the hundreds drum, being out of visual range of the opening 73 through the upper housing wall, so that the tens digit reading appears on the outer circumference of the tens drum.

At the 300 degree position, the hundreds drum is advanced until the first numeral 3 on the outer circumference of the hundreds drum appears through the opening in the upper housing wall, the tens digit reading still appearing on the tens drum 22, until a reading of 309.9° is reached.

At the 310° position of the drums, the numeral 1 on the tens drum sector 24 appears, a portion of the circumferential rim area of the tens drum sector covering the numerals on the outer circumference of the tens drum, the hundreds drum 28 having been rotated until the second numerals 3 on the outer circumference thereof is reached.

At each ten degree angular advance from 310° to 359.9° the tens drum sector, and the hundreds drum are progressively angularly advanced through the angular spacing between one pair of numerals on the circular segmetal rim of the tens drum sector, or 36°, the reading on the outer circumference of the rim of the tens drum sector being progressively advanced from 1 through 5. As there are a total of six numeral 3's on this portion of the outer circumference of the hundreds drum 28, the reading on the hundreds drum remains constant at 3, even though the hundreds drum is progressively angularly advanced, simultaneously with the rotation of the tens drum sector.

After the 359.9 degree rotational angular position is reached, the tens drum sector 24 has again been moved to the end of its visual range through the opening 73 through the upper wall of the housing, so that the zero reading again appears on the outer circumference of the tens drum 22. The rotation of the tens drum sector from a digit 5 reading on the rim of the tens drum sector, to a zero reading on the outer circumference of the tens drum simultaneously moves the hundreds drum from the final 3 numeral on the outer circumference thereof, to the first zero numeral thereon, so that all of the drums indicate zero simultaneously.

This is the zero angular reading and the cycle hereinbefore described may again be repeated.

Due to the fact that all gear trains and stops in the entire system are reversible, the angular reading may be increased from 0° to 359.9° or reduced from 359.9° to 0°, depending upon the direction of rotation of the drive shaft.

In the same manner, the angular reading may either be increased, or decreased at any intermediate position, between 0° and 359.9°, without any changes or adjustments in any parts of the apparatus, other than the change in the direction of rotation of the drive shaft.

Figure 16:
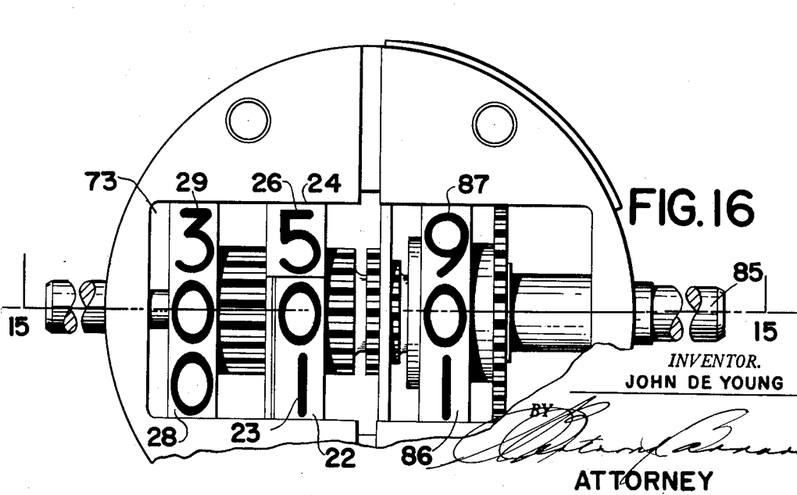
FIGURE 16 is a plan view, similar to FIGURE 2, of the modified angle counter shown in FIGURE 15, showing the various drums, and the numerical designations on the outer circumference of the drums and the outer circumference of the circular segmental rim of the tens drum sector, such as those shown in FIGURES 9 and 10.
Figure 17:
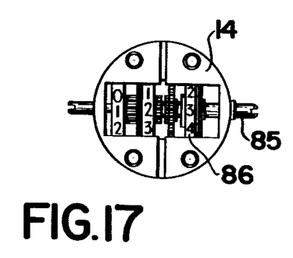
FIGURE 17 is a full size plan view, similar to FIGURES 2 and 16, of the modified angle counter shown in FIGURES 15 and 16, showing the outer housing and the drums visible through the opening in the top wall of the outer housing.
Figure 18:
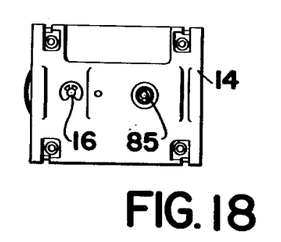
FIGURE 18 is a full size side elevational view of the modified angle counter shown in FIGURES 10 and 11, the actual size and contour of the casing of the counter being substantially the same as that shown in FIGURES 1 and 2.

The modified construction shown in FIGURES 15 and 16 is substantially the same as that shown in FIGURES 1 and 2, and hereinbefore described, except that the tenths drum 17 located at the right-hand end of the unit, FIGURE 2, is eliminated.

The tens drum 22, the tens drum sector 24 and the hundreds drum 28, are substantially the same as those shown in FIGURE 2.

The drive shaft 85, which is utilized to drive the modified angle counter shown in FIGURE 15, is substantially the same as that shown in FIGURE 2, except that it is somewhat longer and projects beyond both circumferential sides of the circular housing 14, so that it can be driven from either end.

The drum support shaft 16 is substantially the same as that shown in FIGURES 1 and 2, and is located in substantially the same position relative to the drive shaft, as that shown in FIGURES 1 and 2.

The units or degree drum 86, which in effect replaces the tenths drum 17, shown in FIGURES 1 and 2, is mounted in the same position relative to the housing 14 as the units or degree drum 20 shown in FIGURES 1 and 2. The units or degree drum, which has a series of numerals 87, ranging from 0 to 9 around the outer circumference thereof, is supported on the drum shaft 16 by a pair of ball bearings 36, 36a separated by a tubular spacer, in substantially the same manner as the tenths drum 17, shown in FIGURES 1 and 2.

The units or degree drum is driven through a pair of gears 88, 89, having a 1:1 ratio, by a gear 88 supported by a tubular sleeve 90 attached to the drive shaft, so that the units or degree drum is rotated through one full revolution for each revolution of the drive shaft, except that it is rotated in the opposite direction.

The units or degree drum therefore makes one full revolution for each revolution of the drive shaft, as contrasted with one 36° step or the distance between one pair of numerals on the outer circumference, for the units or degree drum shown in FIGURES 1 and 2, so that the units or degree drum 86 actually rotates ten times as fast relatively as the units, or degree drum shown in FIGURES 1 and 2, assuming the same rate of rotation of the drive shaft 85.

The Geneva drive used for transmitting the rotation of the units drum to an idler gear, which drives the tens drum 22 and the tens drum sector 24, is substantially the same as that shown in FIGURE 1, except that it is driven by the units or degree drum 86.

The Geneva drive includes a Geneva wheel 91, which is supported by a pinion and hub combination 92 trunnioned on the drive shaft 85, in the same manner as that shown in FIGURES 1 and 4.

The Geneva wheel has six equally spaced radially positioned parallel-faced slots 93, 93a therethrough, the slots progressively receiving a cylindrical pin 94 inserted into and projecting beyond the face of the units or degree drum 86, in the same manner as that shown in FIGURES 3 and 4, the Geneva wheel 91 and the flange pinion 95 of the pinion and hub combination being rotated through a 60° angle for each full revolution of the units or degree drum, and therefore each full revolution of the drive shaft 85.

The flange pinion 95 meshes with an idler gear 54, having an idler pinion and hub combination fitted thereto, in the same manner as that shown in FIGURES 1 and 2. As there is a 3:5 reduction between the flange pinion 95 and the idler gear 54, the idler gear 54 is rotated through an angle of 36°, which is equal to the angular spacing between each pair of numerals on the tens drum 22 for each complete revolution of the units or degree drum.

The tubular locking sleeve 57, which is mounted on the drive shaft 85, in axial alignment therewith, and parallel to the tens drum 22 and the tens drum sector 24, is substantially the same as that shown in FIGURES 1 and 2 and hereinbefore described.

A plate spur gear 61 attached to one flange 57a of the tubular locking sleeve, meshes with the flange pinion 56, which is driven by the idler gear 54 in the same manner as that shown in FIGURE 1.

As the reduction between the idler flange pinion 56 and the plate gear 61 attached to the locking sleeve is 36:10, the intermittent locking sleeve is rotated through 10° for each 36° angular movement of the idler gear, or each full revolution of the units or degree drum 86.

The trip gear 62 attached to the flange 57a of the locking sleeve 57 is substantially the same as that shown in FIGURE 1, the trip gear 62 meshing with a pinion 65, which supports and rotates the tens drum 22 in the same manner as that shown in FIGURE 1.

The tens drum sector 24 and the hundreds drum 28, which are supported by a central sector drive pinion 66 are also substantially the same as those shown in FIGURE 1.

The sector drive pinion 66 is driven by a trip gear 67, which is attached to the parallel flange 57b of the intermittent locking sleeve, the trip gear being constructed in the same manner as that shown in FIGURES 1 and 8.

The trip plate 70 mounted adjacent the trip gear 67 is attached to the flange 57b of the tubular locking sleeve 57 in the same manner as that shown in FIGURES 1 and 8.

The intermittent locking sleeve assembly controls the rotation of the tens drum 22, the tens drum sector, and the hundreds drum 28 attached thereto, in the same manner as that shown in FIGURES 1, 7 and 8.

While the teeth of the tens drum drive pinion 65, pass the undercut area 63 of the trip gear 62, the rotation of the tens drum 22 is suspended in the same manner as that shown in FIGURES 1 and 7.

The sector drive pinion 66, which supports the tens drum sector 22 and the hundreds drum 28, engages the toothed segment 68 of the trip gear 67, shown in FIGURES 1 and 8, while the tens drum 22 is held in the locked position, in the same manner as that shown in FIGURES 1 and 6.

The angular range through which the tens drum sector is driven by the trip gear 67, is substantially the same as that shown in FIGURE 8 and hereinbefore described.

The cutaway teeth in the sector drive pinion 66 and the tens drum drive pinion 65 are substantially the same as those shown in FIGURES 1, 12 and 13, and hereinbefore described, thereby allowing the intermittent locking sleeve 57 to be rotated while the rotation of the pinions 65 and 66 is arrested.

The drive shaft 85 of the modified angle counter, shown in FIGURES 15 and 16, is driven by an external source in the same manner as that shown in FIGURE 1. As the drive shaft 85, shown in FIGURE 15, projects beyond both circumferential sides of the housing 14, it can be driven by a shaft connected to either end thereof.

The units or degree drum 86 is driven by a pair of gears 88, 89, one of which is attached to the drive shaft and the mating gear supported by the drum support shaft 16, in a manner similar to the gears driving the tenths drum shown in FIGURE 1. As the ratio between the degree drum drive gears 88, 89 is 1:1, the ratio of rotation of the units or degree drum 86 relative to the drive shaft 85 is substantially the same as that of the tenths drum 17 shown in FIGURE 1, for the same speed of rotation of the drive shaft 85.

The rotation of the units drum is stepped down by a Geneva wheel mechanism supported on the drive shaft, so that the rotational angular movement of the Geneva wheel is 60° for each full rotation of the units or degree drum.

The rotational angular movement of the Geneva wheel is reduced by the flange pinion 95 attached to the Geneva wheel, and the idler gear 54 supported on the drum shaft, so that the idler gear 54 is rotated through an angle of 36°, or the angular spacing between each pair of numerals on the outer circumference of the tens drum for each 60° angular movement of the Geneva wheel 91.

The flange pinion 56, projecting beyond the face of the idler gear 54, meshes with the plate gear 61 mounted at the outer end of the adjacent flange 57a of the tubular intermittent locking sleeve 57, thereby reducing the angular movement of the tubular locking sleeve to 10° for each 36° angular movement of the idler gear 54.

The trip gear 62 attached to the flange 57a of the intermittent locking sleeve 57, meshes with the pinion 65 attached to the tens drum, so that the 10° angular movement of the intermittent locking sleeve is stepped up to 36°, or the spacing between each pair of numerals on the outer circumference of the tens drum, while the pinion 65 meshes with the toothed section of the trip gear 62.

During the period, through which the tens drum is held stationary by the trip gear 62, the sector drive pinion 66, which is mounted between the tens drum sector and the hundreds drum 28, is driven by the second trip gear 67 attached to the opposite flange 57b of the intermittent locking sleeve 57. This again steps up the angular movement of the sector drive pinion 66 so that the tens drum sector 24 and the hundreds drum 28 are rotated through 36°, or the angular spacing between each pair of numerals on the outer circumference of the tens drum sector rim, for each 10° angular movement of the intermittent locking sleeve 57, in the same manner as that shown in FIGURES 1 and 8.

As during the period, through which the numerals on the rim of the tens drum sector appear through the opening through the upper wall of the housing 14, shown in FIGURE 16, the numerals on the outer circumference of the hundreds drum are repeated. The rotation of the hundreds drum during this period has no effect on the hundreds digit reading, in the same manner as in the angle counter shown in FIGURE 2, until the tens drum sector rim is again out of visual range through the opening 73 through the housing upper wall.

The units, or degree drum has a substantially circular locking plate 96 attached to one face thereof, the locking plate having a cutout 97 in the form of a circular sector, at one edge thereof.

During the period in the rotation of the units, or degree drum 86, in which the locking plate 96 attached to the units drum is in a position similar to that shown in FIGURE 4, the outer circumference of the locking plate 96 fits into one of the circular segmental cutouts 98 around the outer circumference of the Geneva wheel 91, in substantially the same manner as that shown in FIGURE 4. This locks the Geneva wheel and prevents rotation thereof, while the units or degree drum 86 and the locking plate attached thereto are in substantially the angular range shown in FIGURE 4, relative to the Geneva wheel.

After the units drum 86 reaches a rotational angular position, at which the projecting pin 94 inserted therein is aligned with one of the radial slots 93 through the Geneva wheel, in a manner similar to that shown in dot-dash lines, FIGURE 4, and in the FIGURE 3, the cylindrical pin progressively moves into and along the radial slot 93 through the Geneva wheel.

The continued rotation of the units, a degree drum 86 causes the Geneva wheel 91 to be moved through a rotational angle of 60°, which is equal to the angular spacing between the radial slots 93, 93a through the Geneva wheel, the locking plate 96 being simultaneously rotated into a position in which the circular segmental cutout therethrough allows the Geneva wheel to rotate freely. This position of the locking plate is substantially the same as that shown in FIGURE 3.

The angular movement of the Geneva wheel, through a range of 60°, causes the idler gear 54 to be rotated through 36°, thereby causing the intermittent locking sleeve 57 to be rotated through a 10° angle, in the manner hereinbefore described.

The relation between the cylindrical pin 94 and the units, or degree drum 86 is substantially the same as that shown in FIGURE 3, so that when the Geneva wheel 91 is at the end of its 60° rotational angular movement, the degree drum at an angular position, between a pair of numerals on the outer circumference thereof, the units or degree drum having completed a full transfer or the rotational angular movement of the units, or degree drum through an angle represented by the spacing between a pair of numerals on the outer circumference thereof, during the period in which the Geneva wheel is rotated through 60°.

From a zero angle reading on the outer circumference of the units or degree drum 86, until the reading on the outer circumference of the units drum is 9 degrees, the tens drum, the tens drum sector, and the hundreds drum are stationary.

From the 10° to the 99° drum positions, the hundreds drum 28 and the tens drum sector are locked, the units drum and the tens drum advancing progressively from 10 to 99 degrees in the manner hereinbefore described.

From the 100° to the 309° drum positions, the units drum, the tens drum, and the hundreds drum advance progressively, with rotation of the drive shaft, the tens drum sector 24, which rotates with the hundreds drum, being out of visual range of the opening through the upper housing wall, so that the tens reading appears on the outer circumference of the tens drum 22.

At the 300 degree position, the hundreds drum is advanced until the first numeral 3 on the outer circumference of the hundreds drum 28 appears through the opening 73 through the upper housing wall, the tens digit reading still appearing on the tens drum until a reading of 309° is reached.

At the 310° drum position, the numeral 1 appears on the outer circumference of the rim of the tens drum sector 24, a portion of the circumferential rim area of the tens drum sector covering the adjacent tens drum numerals, the hundreds drum having been rotated until the second numeral 3 on the outer circumference thereof is reached.

At each ten degree angular interval from 310 to 359°, the tens drum sector 24 and the hundreds drum 28, are progressively advanced through the angular spacing between one pair of numerals on the rim of the tens drum sector, or 36°, the reading on the outer circumference of the rim of the tens drum sector being progressively advanced from 1 through 5. The reading on the hundreds drum 28 remains constant at 3, during this period, even though the hundreds drum is progressively rotated.

At 359°, the tens drum sector is again at the end of its visual range through the opening 73 through the housing upper wall, so that the next 0 reading again appears on the outer circumference of the tens drum. The rotation of the tens drum sector from 9, until a zero reading appears on the tens drum, simultaneously rotates the hundreds drum from the final numeral 3 on the outer circumference thereof, to the first zero numeral, so that all of the drums indicate 0 simultaneously, in substantially the same manner as those shown in FIGURE 2, and hereinbefore described.

This is the zero reading and the cycle can be repeated in the same manner as that shown in FIGURE 2.

Due to the fact that all gear trains and stops in the entire system are reversible, the angle reading may be increased or reduced at any point in the cycle, in the same manner as that shown in FIGURE 2, and hereinbefore described.

It will be apparent to those skilled in the art, that the present invention is not limited to the specific details described above and shown in the drawings, and that various modifications are possible in carrying out the features of the invention and the operation and the method of co-ordination, synchronization and utilization thereof, without departing from the spirit and scope of the appended claims.

What is claimed is:

1. An angle counter for indicating the angular movement of a shaft over a 360° range, comprising a substantially cylindrical housing, a drive shaft, the angular rotation of which is to be co-ordinated with the angle counter fitted to said housing, a series of drums carrying peripheral designations corresponding respectively to units, tens and hundreds, located substantially parallel to the drive shaft, a second cylindrical shaft supported by the housing substantially parallel to the drive shaft rotatably supporting the series of drums, a tens drum sector having a circular segmental integral rim covering a portion of the peripheral designations of the tens drum mounted adjacent the tens drum, means trunnioned on the second cylindrical shaft fixedly attached to and supporting the tens drum sector and the hundreds drum, the rim of said tens drum sector carrying designations representing a portion of the peripheral designations on the tens drum, a first transfer mechanism operative to advance the tens drum in response to rotation of the units drum for indicating tens, an intermittent locking mechanism co-ordinated with the first transfer mechanism, to interrupt the rotation of the tens drum between predetermined angular designations thereon, a second transfer mechanism co-ordinated with the first transfer mechanism to advance the tens drum sector and the hundreds drum in response to rotation of the units drum during the periods of rest of the tens drum, whereby during said periods, the tens designations appear on the outer circumference of the rim of the tens drum sector.

2. An angle counter for indicating the angular movement of a shaft over a 360° range, comprising a substantially cylindrical housing, a drive shaft, the angular rotation of which is to be co-ordinated with the angle counter, fitted to said housing, a plurality of anti-friction bearings mounted in the housing rotatably supporting the drive shaft, a series of drums carrying peripheral designations corresponding respectively to units, tens and hundreds, located substantially parallel to the drive shaft, a second shaft supported by the housing substantially parallel to the drive shaft rotatably supporting the series of drums, a tens drum sector having a circular segmental integral rim covering a portion of the peripheral designations of the tens drum mounted adjacent the tens drum, means trunnioned on the second cylindrical shaft fixedly attached to and supporting the tens drum sector and the hundreds drum, the rim of said tens drum sector carrying designations representing a portion of the peripheral designations on the tens drum, a first transfer mechanism operative to advance the tens drum in response to rotation of the units drum for indicating tens, an intermittent locking mechanism co-ordinated with the first transfer mechanism, to interrupt the rotation of the tens drum between predetermined angular designations thereon, a second transfer mechanism co-ordinated with the first transfer mechanism to advance the tens drum sector and the hundreds drum in response to rotation of the units drum, during the periods of rest of the tens drum, whereby during said periods, the tens designations appear on the outer circumference of the rim of the tens drum sector, the designations on the outer circumference of the hundreds drum being substantially constant during the period through which predetermined tens designations appear on the outer circumference of the rim of the tens drum sector.

3. An angle counter for indicating the angular movement of a shaft over a 360° range, comprising a substantially cylindrical housing, a drive shaft, the angular rotation of which is co-ordinated with the angle counter fitted to said housing, a plurality of anti-friction bearings mounted in the housing, rotatably supporting the drive shaft, a series of drums carrying peripheral designations corresponding respectively to tenths, units, tens and hundreds rotatably mounted on a second substantially cylindrical shaft supported by the housing substantially parallel to the drive shaft, means connecting the drive shaft to the tenths drum to co-ordinate the rotation of the tenths drum with the rotation of the drive shaft, a first transfer mechanism interconnecting the tenths drum and the units drum for advancing the units drum one step for each complete revolution of the tenths drum, a tens drum sector having a circular segmental integral rim covering a portion of the peripheral designations of the tens drum, mounted adjacent the tens drum, means trunnioned on the second cylindrical shaft fixedly attached to and supporting the tens drum sector and the hundreds drum, the outer circumference of the rim of said tens drum sector carrying designations representing a portion of the scale on the outer circumference of the tens drum, a second transfer mechanism operative to advance the units drum in response to rotation of the tenths drum for indicating units, a third transfer mechanism operative to advance the tens drum in response to rotation of the units drum for indicating tens, an intermittent locking mechanism, co-ordinated with the second transfer mechanism to interrupt the rotation of the tens drum, between predetermined angular designations, and to advance the tens drum sector and the hundreds drum in response to rotation of the units drum, during periods of rest of the tens drum, whereby during said periods, the tens designation appears on the outer circumference of the rim of the tens drum sector, the designations on the hundreds drum being substantially constant during a portion of the period in which tens designations appear on the outer circumference of the rim of the tens drum sector, the first transfer mechanism including a Geneva wheel trunnioned on the drive shaft, a pin attached to and projecting beyond one end surface of the tenths drum adapted to engage the Geneva wheel to control the rotation thereof, a pinion attached to the Geneva wheel, and a gear meshing with the Geneva wheel pinion, attached to the units drum, said Geneva wheel and gear train combination being adapted to advance the units drum one rotational step for each full revolution of the tenths drum.

4. An angle counter for indicating the rotational angular movement of a shaft over a 360° range, comprising a substantially cylindrical housing, a drive shaft, the angular rotation of which is co-ordinated with the angle counter fitted to said housing, a series of drums carrying peripheral designations corresponding respectively to tenths, units, tens, and hundreds rotatably mounted on a second substantially cylindrical shaft supported by the housing substantially parallel to the drive shaft, means connecting the drive shaft to the tenths drum to co-ordinate the rotation of the tenths drum with the rotation of the drive shaft, a first transfer mechanism interconnecting the tenths drum and the units drum for advancing the units drum one step for each complete revolution of the tenths drum, a tens drum sector having a circular segmental integral rim covering a portion of the peripheral designations of the tens drum mounted adjacent the tens drum, means trunnioned on the second cylindrical shaft fixedly attached to and supporting the tens drum sector and the hundreds drum, the outer circumference of the rim of said tens drum sector carrying designations representing a portion of the scale on the outer circumference of the tens drum, a second transfer mechanism operative to advance the units drum in response to rotation of the tenths drum for indicating units, a third transfer mechanism operative to advance the tens drum in response to rotation of the units drum for indicating tens, an intermittent locking mechanism co-ordinated with the second transfer mechanisms to interrupt the rotation of the tens drum, between predetermined angular designations, and to advance the tens drum sector and the hundreds drum in response to rotation of the units drum, during periods of rest of the tens drum, whereby during said periods, the tens designation appears on the outer circumference of the rim of the tens drum sector, the first transfer mechanism including a Geneva wheel trunnioned on the drive shaft, a substantially cylindrical pin attached to and projecting beyond one end face of the tenths drum, adapted to engage the Geneva wheel to control the rotation thereof, means attached to the tenths drum adapted to engage the Geneva wheel to arrest the rotation of the Geneva wheel, between time intervals during which the Geneva wheel is angularly advanced by the cylindrical pin attached to the tenths drum, a pinion attached to the Geneva wheel, and a gear meshing with the Geneva wheel pinion, attached to the units drum, said Geneva wheel and gear train combination being adapted to advance the units drum one rotational step for each full revolution of the tenths drum.

5. An angle counter for indicating the angular movement of a shaft over a 360° range, comprising a substantially cylindrical housing, a drive shaft, the angular rotation of which is co-ordinated with the angle counter, fitted to said housing, a plurality of anti-friction bearings mounted in the housing rotatably supporting the drive shaft, a series of drums carrying peripheral designations corresponding respectively to tenths, units, tens and hundreds, located substantially parallel to the axis of the drive shaft, a second substantially cylindrical shaft supported by the housing, substantially parallel to the axis of rotation of the drive shaft, rotatably supporting the drums, means operatively connecting the drive shaft to the tenths drum to co-ordinate the rotation of the tenths drum with the rotation of the drive shaft, a tens drum sector having an integral circular segmental rim covering a portion of the peripheral designations of the tens drum, mounted adjacent the tens drum, a tubular pinion trunnioned on the second cylindrical shaft, attached to and supporting the tens drum sector and the hundreds drum, said tubular pinion being adapted to drive the tens drum sector and the hundreds drum, the outer circumference of the rim of said tens drum sector carrying designations representing a portion of the designation scale on the outer circumference of the tens drum, a first transfer mechanism operative to advance the units drum in response to the rotation of the tenths drum, a tubular intermittent locking unit mounted on the drive shaft in substantially axial alignment with the tens and hundreds drums, a second transfer mechanism operative to rotate the intermittent locking unit, co-ordinated with the rotation of the units drum, a third transfer mechanism driven by the intermittent locking unit operative to advance the tens drum in response to the rotation of the units drum for indicating tens, means incorporated with the intermittent locking unit operative to interrupt the rotation of the tens drum between predetermined angular designations, and means incorporated with the intermittent locking unit operative to advance the tens drum sector and the hundreds drum during the periods of rest of the tens drum, whereby during said periods of rest of the tens drum, the tens designation appears on the outer circumference of the rim of the tens drum sector, the second transfer mechanism including a tubular dual pinion trunnioned on the drive shaft in substantial axial alignment with the units drum, a locking disc having a plurality of substantially radially positioned teeth integral therewith attached to one end of the tubular dual pinion, said tubular dual pinion having a first flange pinion integral with one end thereof, a trip gear attached to the units drum in axial alignment with the first flange pinion adapted to intermittently angularly advance the first flange pinion, a locking plate attached to the units drum in substantial axial alignment with the locking disc, attached to the tubular dual pinion, said locking plate being adapted to engage the dual pinion locking disc to prevent rotation thereof, said locking plate having means formed therein adapted to clear one of the teeth of the tubular dual pinion locking disc to permit rotation of the tubular dual pinion when the teeth of the trip gear are in engagement with the first flange pinion of the tubular dual pinion, an idler gear trunnioned on the second cylindrical shaft, in axial alignment with the second flange pinion of the tubular dual pinion, and a pinion attached to the idler gear co-axially therewith, said pinion being adapted to drive the third transfer means co-ordinated with the rotation of the units drum.

6. An angle counter for indicating the rotational angular movement of a shaft over a 360° range, comprising a substantially cylindrical housing, a drive shaft, the angular rotation of which is co-ordinated with the angle counter fitted to said housing, a series of drums carrying peripheral designations corresponding respectively to tenths, units, tens, and hundreds located substantially parallel to the axis of the drive shaft, a second substantially cylindrical shaft supported by the housing substantially parallel to the axis of rotation of the drive shaft rotatably supporting the drums, means operatively connecting the drive shaft to the tenths drum to coordinate the rotation of the tenths drum with the rotation of the drive shaft, a tens drum sector having an integral circular segmental rim covering a portion of the peripheral designations of the tens drum, mounted adjacent the tens drum a tubular pinion trunnioned on the second cylindrical shaft, attached to and supporting the tens drum sector and the hundreds drum, said tubular pinion being adapted to rotatably drive the tens drum sector and the hundreds drum, the outer circumference of the rim of said tens drum sector carrying designations representing a portion of the designation scale on the outer circumference of the tens drum, a first transfer mechanism operative to advance the units drum in response to the rotation of the tenths drum, a tubular intermittent locking unit mounted on the drive shaft in substantially axial alignments with the tens and hundreds drums, a second transfer mechanism operative to rotate the intermittent locking unit coordinated with the rotation of the units drum, a third transfer mechanism driven by the intermittent locking unit operative to advance the tens drum in response to the rotation of the units drum for indicating tens, means incorporated with the intermittent locking unit operative to interrupt the rotation of the tens drum between predetermined angular designations, and means incorporated with the intermittent locking unit operative to advance the tens drum sector and the hundreds drum during periods of rest of the tens drum, the second transfer means including an idler gear trunnioned on the second cylindrical shaft, an idler pinion attached to the idler gear co-axially therewith, means rotatably fitted to the drive shaft adapted to rotate the idler gear co-ordinated with the rotation of the units drum, the tubular intermittent locking mechanism including a tubular intermittent locking sleeve rotatably supported by the drive shaft in substantial axial alignment with the tens drum, a plurality of anti-friction bearings fitted to the drive shaft, rotatably supporting the tubular intermittent locking sleeve, a drive gear attached to one end of the tubular intermittent locking sleeve, co-axially therewith, meshing with and in axial alignment with the idler pinion, a tens drum drive pinion attached to the tens drum, co-axially therewith, said tens drum drive pinion being trunnioned on the second cylindrical shaft, a trip gear having a circular segmental cutout eliminating a portion of the teeth thereof, attached to the intermittent locking sleeve in axial alignment with the tens drum drive pinion, said trip gear being adapted to angularly advance the tens drum drive pinion, said tens drum drive pinion and the tens drum attached thereto being held relatively stationary, while the circular segmental cutout area of the trip gear clears the tens drum drive pinion.

7. An angle counter for indicating the rotational angular movement of a shaft, as in claim 5, in which the second transfer means includes, a tubular intermittent locking sleeve rotatably supported by the drive shaft in substantial axial alignment with the tens drum, a plurality of anti-friction bearings fitted to the drive shaft rotatably supporting the tubular locking sleeve, a drive gear attached to one end of the tubular intermittent locking sleeve, co-axially therewith, meshing with and in axial alignment with the idler pinion, a tens drum drive pinion attached to the tens drum, co-axially therewith, said tens drum drive pinion being trunnioned on the second cylindrical shaft, means attached to the intermittent locking sleeve adapted to intermittently rotate the tens drum drive pinion and the tens drum attached thereto, a sector drive pinion trunnioned on the second cylindrical shaft, between the tens drum sector and the hundreds drum, the tens drum sector and the hundreds drum being fixedly attached to the sector drive pinion, a trip gear attached to the intermittent locking sleeve concentrically therewith, in substantial axial alignment with the sector drive pinion, a circular sector of the outer circumference of the trip gear, having teeth therein, meshing with the sector drive pinion, a trip plate having a pair of diametrically opposite locking segments integral therewith, attached to the tubular locking sleeve, adjacent the trip gear, the locking segments of the trip plate being spacedly radially located relative to the toothed segment of the trip gear, a portion of selected teeth of the sector drive pinion being cut out to clear the locking segments of the trip plate, during a portion of the rotation of the trip plate.

8. An angle counter for indicating the rotational angular movement of a shaft over a 360° range, comprising a substantially cylindrical housing, a drive shaft, the angular rotation of which is co-ordinated with the angle counter, fitted to said housing, a series of drums carrying peripheral designations corresponding respectively to tenths, units, tens, and hundreds located substantially parallel to the axis of rotation of the drive shaft, a second substantially cylindrical shaft supported by the housing substantially parallel to the axis of rotation of the drive shaft rotatably supporting the drums, means operatively connecting the drive shaft to the tenths drum to co-ordinate the rotation of the tenths drum with the rotation of the drive shaft, a tens drum sector having an integral circular segmental rim covering a portion of the peripheral designations of the tens drum mounted adjacent the tens drum, a tubular pinion trunnioned on the second cylindrical shaft attached to and supporting the tens drum sector and the hundreds drum, said tubular pinion being adapted to drive the tens drum sector and the hundreds drum, the outer circumference of the rim of said tens drum sector carrying designations representing a portion of the designation scale on the outer circumference of the tens drum, a first transfer mechanism operative to advance the units drum in response to the rotation of the tenths drum, a tubular intermittent locking unit mounted on the drive shaft in substantially axial alignment with the tens and hundreds drums, a second transfer mechanism operative to rotate the intermittent locking unit, co-ordinated with the rotation of the units drum, a third transfer mechanism driven by the intermittent locking unit operative to advance the tens drum in response to the rotation of the units drum for indicating tens, mean incorporated with the intermittent locking unit operative to interrupt the rotation of the tens drum between predetermined angular designations, and means incorporated with the intermittent locking unit operative to advance the tens drum sector and the hundreds drum during periods of rest of the tens drum, the second transfer mechanism including a tubular dual pinion trunnioned on the drive shaft in substantial axial alignment with the units drum, a locking disc having a plurality of substantially radially positioned teeth integral therewith, attached to one end of the tubular dual pinion, said tubular dual pinion having a first flange pinion integral with one end thereof, a first trip gear attached to the units drum in axial alignment and meshing with the first flange pinion, a locking plate attached to the units drum, in substantial axial alignment with the locking disc attached to the tubular dual pinion, said locking plate being adapted to engage the dual pinion locking disc to prevent rotation thereof, said locking plate having means formed therein, adapted to clear one of the teeth of the tubular dual pinion locking disc to permit rotation of the tubular dual pinion when the teeth of the first trip gear are in engagement with the first flange pinion of the tubular dual pinion, an idler gear trunnioned on the second cylindrical shaft in axial alignment with the second flange pinion of the tubular dual pinion, a pinion attached to the idler gear co-axially therewith, the second flange pinion of the tubular dual pinion being adapted to rotate the idler gear co-ordinated with the rotation of the units drum, the tubular intermittent locking unit including a tubular intermittent locking sleeve rotatably supported by the drive shaft, in substantial axial alignment with the tens drum, a drive gear attached to one end of the tubular intermittent locking sleeve, co-axially therewith, said drive gear meshing with the idler pinion, a tens drum drive pinion attached to the tens drum co-axially therewith, said tens drum drive pinion being trunnioned on the second cylindrical shaft, a second trip gear having a circular segmental cutout eliminating a portion of the teeth thereof attached to the tubular locking sleeve in axial alignment with the tens drum drive pinion, said second trip gear being adapted to angularly advance the tens drum drive pinion, said tens drum drive pinion and the tens drum attached thereto being held relatively stationary, while the circular segmental cutout area of the second trip gear clears the tens drum drive pinion, a sector drive pinion trunnioned on the second cylindrical shaft between the tens drum sector and the hundreds drum, the tens drum sector and the hundreds drum being fixedly attached to the sector drive pinion, the third transfer mechanism including a third trip gear attached to the intermittent locking sleeve concentrically therewith in axial alignment with the sector drive pinion, the third trip gear having a circular segmental toothed area extending over a portion of the outer circumference thereof, a trip plate having a pair of diametrically opposite locking segments integral therewith, attached to the tubular locking sleeve adjacent the third trip gear, the locking segments of the trip plate being spacedly radially located relative to the toothed segment of the third trip gear, a portion of selected teeth of the sector drive pinion being cut out to clear the locking segments of the trip plate during a portion of the rotation of the trip plate.

9. An angle counter for indicating the angular movement of a shaft over a 360° range, comprising a substantially cylindrical housing, a drive shaft, the angular rotation of which controls the operation of the angle counter, fitted to said housing, a plurality of anti-friction bearings mounted in the housing rotatably supporting the drive shaft, a series of index drums carrying designations indicating respectively, units, tens and hundreds, located substantially parallel to the axis of the drive shaft, a second cylindrical shaft supported by the housing, co-axial with the index drums, rotatably supporting the index drums, means operatively connecting the drive shaft to the units index drum to advance the units index drum one step for each unit movement of the drive shaft, a combination transfer and intermittent locking mechanism interconnecting the units and tens index drums, to advance the tens index drum one step for each of a pre-determined number of unit movements of the units index drum, and to leave the tens index drum at rest during a second pre-determined number of unit movements of the units index drum, a tens drum sector having an integral rim having an index area covering a portion of the index area of the tens index drum, mounted concentrically with the second cylindrical shaft, means rotatably fitted to the second cylindrical shaft adapted to support and drive the tens drum sector and the hundreds index drum, the combination transfer and intermittent locking mechanism being operative to advance the tens drum sector and the hundreds index drum in step by step response to the second number of unit movements of the units index drum, while the tens index drum is at rest, the combination transfer and intermittent locking mechanism being operative to advance the tens drum sector and the hundreds index drum one step for each complete revolution of the units index drum, the combination transfer and intermittent locking mechanism including a Geneva wheel trunnioned on the drive shaft, a substantially cylindrical pin attached to and projecting beyond one face of the units drum adapted to engage the Geneva wheel to control the rotation thereof, means attached to the units drum adapted to engage the Geneva wheel to arrest the rotation of the Geneva wheel between time intervals during which the Geneva wheel is angularly advanced by the pin attached to the units drum, a pinion attached to the Geneva wheel co-axially therewith, an idler gear trunnioned on the second cylindrical shaft, an idler pinion attached to the idler gear co-axially therewith, the pinion attached to the Geneva wheel being adapted to rotate the idler gear co-ordinated with the rotation of the units drum, said Geneva wheel and gear train combination being adapted to advance the idler gear one angular step, representing the angle subtended by the spacing between a pair of numerals on the outer circumference of the tens drum for each full rotation of the units drum.

10. An angle counter for indicating the rotational angular movement of a shaft over a 360° range, comprising a substantially cylindrical housing, a drive shaft, the angular rotation of which controls the operation of the angle counter, fitted to said housing, a series of index drums carrying designations indicating respectively, units, tens, and hundreds, located substantially parallel to the axis of the drive shaft, a second cylindrical shaft supported by the housing, co-axial with the index drums, rotatably supporting the index drums, means operatively connecting the drive shaft to the units index drum to advance the units index drum one step for each rotational unit movement of the drive shaft, a combination transfer and intermittent locking mechanism interconnecting the units and tens index drums to advance the tens index drum one step for each of a predetermined number of unit movements of the units index drum, and to leave the tens index drum at rest during a second predetermined number of unit movements of the units index drum, a tens drum sector having an integral rim having an index area covering a portion of the index area of the tens index drum mounted concentrically with the second cylindrical shaft, means rotatably fitted to the second cylindrical shaft adapted to support and drive the tens drum sector and the hundreds index drum, the combination transfer and intermittent locking mechanism being operative to advance the tens drum sector and the hundreds index drum in step by step response to the second number of unit movements of the units index drum, while the tens index drum is at rest, the combination transfer and intermittent locking mechanism being operative to advance the tens drum sector and the hundreds index drum one step for each complete revolution of the units index drum, the combination transfer and intermittent locking mechanism including an idler gear trunnioned on the second cylindrical shaft, an idler pinion attached to the idler gear, co-axially therewith, means rotatably fitted to the drive shaft adapted to rotate the idler gear co-ordinated with the rotation of the units drum, the combination transfer and intermittent interlocking mechanism including a tubular intermittent locking sleeve rotatably supported by the drive shaft in substantial axial alignment with the tens drum, a plurality of anti-friction bearings fitted to the drive shaft rotatably supporting the tubular intermittent locking sleeve, a drive gear attached to one end of the tubular intermittent locking sleeve, co-axially therewith, a tens drum drive pinion attached to the tens drum, co-axially therewith, said tens drum drive pinion being trunnioned on the second cylindrical shaft, a trip gear having a circular segmental cutout eliminating a portion of the teeth thereof attached to the intermittent locking sleeve in substantial axial alignment with the tens drum drive pinion, said trip gear being adapted to angularly advance the tens drum drive pinion, the tens drum drive pinion and the tens drum attached thereto being held relatively stationary while the circular segmental cutout area of the trip gear clears the tens drum drive pinion.

11. An angle counter for indicating the rotational angular position of a shaft, as in claim 10, in which the combination transfer and intermittent locking mechanism includes a trip plate having a pair of diametrically opposite locking segments integral therewith, attached to the tubular locking sleeve, adjacent the trip gear, the locking segments of the trip plate being spacedly radially located relative to the toothed sector of the trip gear, a portion of selected teeth of the sector drive pinion being cut out to clear the locking segments of the trip plate, during a portion of the rotation of the trip plate.

12. An angle counter for indicating the rotational angular movement of a shaft over a 360° range, comprising a substantially cylindrical housing, a drive shaft, the angular rotation of which controls the operation of the angle counter fitted to said housing, a series of index drums carrying designations indicating respectively, units, tens, and hundreds, located substantially parallel to the axis of rotation of the drive shaft, a second cylindrical shaft supported by the housing, co-axial with the index drums, rotatably supporting the index drums, means operatively connecting the drive shaft to the units index drum to advance the units index drum one step for each unit rotational movement of the drive shaft, a combination transfer and intermittent locking mechanism interconnecting the units and tens index drums to advance the tens index drum one step for each of a predetermined number of unit movements of the units index drum, and to leave the tens index drum at rest during a second predetermined number of unit movements of the units index drum, a tens drum sector having an integral rim having an index area covering a portion of the index area of the tens index drum mounted concentrically with the second cylindrical shaft, means rotatably fitted to the second cylindrical shaft adapted to support and drive the tens drum sector and the hundreds index drum, the combination transfer and intermittent locking mechanism being operative to advance the tens drum sector and the hundreds index drum in step by step response to the second number of unit movements of the units index drum, while the tens index drum is at rest, the combination transfer and intermittent locking mechanism being operative to advance the tens drum sector and the hundreds index drum one step for each complete revolution of the units index drum, the combination transfer and intermittent locking mechanism including a tubular pinion and hub combination trunnioned on the drive shaft, a Geneva wheel supported by the tubular pinion and hub combination, co-axially therewith, and means attached to the units drum adapted to control the rotation of the Geneva wheel, a flange pinion integral with the pinion and hub combination adjacent the Geneva wheel, an idler gear trunnioned on the second tubular shaft in axial alignment with the flange pinion of the pinion and hub combination, an idler pinion attached to the idler gear co-axially therewith, said idler pinion being adapted to drive the tens drum transfer and intermittent locking mechanism co-ordinated with the rotation of the units drum.

13. An angle counter for indicating the rotational angular position of a shaft, as in claim 12, in which the combination transfer and intermittent locking mechanism includes a tubular intermittent locking sleeve rotatably supported by the drive shaft in substantially axial alignment with the tens drum, a drive gear attached to one end of the tubular intermittent locking sleeve, co-axially therewith, a tens drum drive pinion trunnioned on the second cylindrical shaft, attached to the tens drum, co-axially therewith, a first trip gear having a circular segmental cutout eliminating a portion of the circumferential teeth thereof, attached to the intermittent locking sleeve, in substantial axial alignment with the tens drum drive pinion, said first trip gear being adapted to angularly advance the tens drum drive pinion, the tens drum drive pinion and the tens drum attached thereto being held relatively stationary while the circular segmental cutout area of the first trip gear clears the tens drum drive pinion, a sector drive pinion located between the tens drum sector and the hundreds drum and fixedly attached thereto, trunnioned on the second cylindrical shaft, a second trip gear attached to the intermittent locking sleeve concentrically therewith, in substantial axial alignment with the sector drive pinion, a circular sector of the second trip gear, having teeth thereon, meshing with the sector drive pinion, a trip plate having a pair of diametrically opposite locking segments integral therewith, attached to the tubular locking sleeve, adjacent the second trip gear, the locking segments of the trip plate being spacedly radially located relative to the toothed segment of the second trip gear, a portion of selected teeth of the sector drive pinion being cut out to clear the locking segments of the trip plate during a portion of the rotation of the trip plate.

References Cited in the file of this patent

UNITED STATES PATENTS

| | | |
|---|---|---|
| 2,351,814 | Holzner | June 20, 1944 |
| 2,420,808 | Bliss | May 20, 1947 |
| 2,463,594 | Brigham | Mar. 8, 1949 |
| 2,682,373 | Opocensky et al. | June 29, 1954 |
| 2,712,413 | Hayek | July 5, 1955 |
| 2,719,004 | Bliss | Sept. 27, 1955 |
| 3,018,043 | Dring | Jan. 23, 1962 |